United States Patent [19]
Chapman

[11] 3,752,588
[45] Aug. 14, 1973

[54] LASER FOOTBALL FIRST DOWN MEASURING DEVICE

[76] Inventor: James D. Chapman, 2430 Butt Ave., Lima, Ohio

[22] Filed: July 14, 1971

[21] Appl. No.: 162,471

[52] U.S. Cl. .................. 356/152, 356/172, 33/289
[51] Int. Cl. .......................................... G01b 11/26
[58] Field of Search.................... 356/138–149, 356/247–250, 253–255; 350/54, 84

[56] References Cited
UNITED STATES PATENTS

| | | | |
|---|---|---|---|
| 3,603,691 | 9/1971 | Hamilton | 356/152 |
| 3,606,549 | 9/1971 | Coccoli et al. | 356/152 |
| 3,588,249 | 6/1971 | Studebaker | 356/4 |
| 3,482,317 | 12/1969 | Truax | 33/289 |

Primary Examiner—Benjamin A. Borchelt
Assistant Examiner—S. C. Buczinski
Attorney—Richard C. Sughrue, Gideon Franklin Rothwell et al.

[57] ABSTRACT

An optical laser measuring device more particularly for measuring the required distance necessary for a first down in the sport of football. The forward pole marker includes a laser unit pivotably mounted to the marker for sweeping the football field with a visible signal. Means for perpendicularly aligning the laser unit is provided on the pole marker and insulation for protecting the laser unit from shock can be optionally added.

8 Claims, 3 Drawing Figures

PATENTED AUG 14 1973 3,752,588

INVENTOR
JAMES CHAPMAN

BY Sughrue, Rothwell, Mion, Zinn & Macpeak
ATTORNEYS 3,752,588

LASER FOOTBALL FIRST DOWN MEASURING DEVICE

BACKGROUND OF THE INVENTION

1. Field of the Invention

The present invention relates generally to providing a measurement device that utilizes a laser for referencing a relative set distance.

In particular, the present invention is directed to providing a laser measuring device to be utilized in sports, such as football, where a set distance is required to be established to permit the game to operate within its rules.

2. Description of the Prior Art

In the game of football a key parameter or goal is the moving of the ball by the offensive team a set distance to retain possession of the ball over a period of downs or plays. As is well known, the rules of football set forth a distance of 10 yards and give an offensive team four attempts in which to move the football beyond the 10 yard distance. In numerous occasions throughout the average football game, the officials of the game must resort to sideline markers to establish whether the offensive team has carried the ball the required distance. The standard alignment system that is utilized is generally a pair of poles and a chain which constitute a set distance of 10 yards. Since the game of football is played on a field roughly 53 yards wide and 100 yards long, it is necessary during the normal game to carry the yard markers from the sideline onto the field of play to measure the relative position of the football numerous times.

Although the game of football has become a relatively complex sport, involving literally millions of invested dollars, its crude alignment system has remained relatively the same since the conception of the sport.

There have been attempts such as the Trauax U.S. Pat. No. 3,482,317(1969) to improve upon the conventional first down measuring device by providing a periscope for providing a visual indication with the sights of the periscope to permit an official to determine if the football has been moved a set distance. A similar football yardage telescope is disclosed in the Peresenyi U.S. Pat. No. 2,835,036(1958). Neither of these devices, however, has met ready acceptance in the sport. This may be due in part to the unique requirements of an alignment system in the sport of football. Due to the nature of the game, the alignment system must be relatively simple, sturdy, and provide a quick readily ascertainable set distance. Since the ball is moved frequently, the alignment system must be capable of being quickly set up and moved to meet the requirements of the play. Further, both an emotional and psychological factor exist, which require an alignment system in which the spectators and the players themselves may take part in determining if the ball has traveled the set distance.

SUMMARY OF THE INVENTION

The present invention provides an alignment system that is particularly designed to meet the requirements of the sport of football. The alignment system is capable of quickly providing an accurate and set distance on the sidelines with a capability of providing a visual representation of the distance on the field adjacent to the football to determine if the football has been moved the set distance. This is accomplished by providing a laser unit with a unique support for insuring the perpendicular alignment of the laser unit with the playing field.

The laser unit itself is pivotably mounted on the forward pole marker frame and provides a vertical sweep across the width of the field, to provide a visual indication of the set distance in which the ball must be moved. The contact of the laser beam with the field and/or the football permits both the spectators, players and the officials to determine if the football has been moved the required distance. The power supply can be attached directly to the frame of the marker pole and a unique base can be used to insure that the laser unit will be appropriately positioned perpendicular to the sidelines of the playing field. As in a conventional football measuring system, a chain and a conventional marker pole will mark where the ball had previously been positioned. Other forms of alignment using the laser beam can be utilized to insure a perpendicular placement with respect to the field of the measuring laser beam.

To compensate for the violent nature of the sport, and the commensurate degree of roughness to which the laser first down measuring device will be subjected, a special housing is integrally connected with the laser unit and provides a foam insulation, such as styrofoam, to cushion the laser unit from any violent shocks.

The base of the supporting frame can be of a triangular configuration which places two of the triangular points on the out of bounds line of the football field with the remaining triangular point exactly in line with the lens of the laser beam and representing the plane beyond which the offensive team must move the ball to gain the first down.

DESCRIPTION OF THE PREFERRED EMBODIMENT

Figure 3:
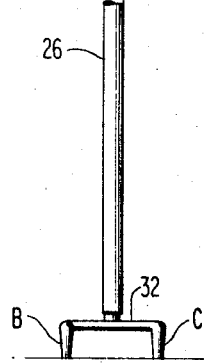
FIG. 3 is a side elevational view of FIG. 2.
Figure 2:
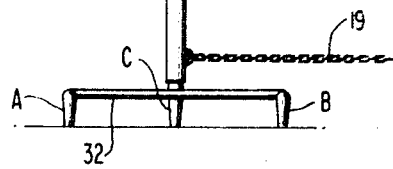
FIG. 2 is a front elevational view of the laser football first down measuring device of the present invention.

Referring to FIGS. 2 and 3, the laser first down measuring device consists essentially of the standard yard marker "bulls eye" 14 attached to tubing 11. A rectangular tube frame 16 with a rectangular base 20 mounts the laser unit 22. The laser unit 22 is pivotably mounted to the rectangular base 20 by a hinge 18. The laser unit 22 comprises a sheet metal housing 12 having a laser 25 mounted therein, which, for example, can be a helium-neon gas laser sold under the name "Lablite" by Spectra-Physics, Inc. of California. The laser 21 is securely positioned within the sheet metal housing 12 by poured foam insulation 24. The foam insulation can be of a number of different compositions as long as it insures that the laser will be protected from sudden shocks. Styrofoam has been successfully utilized as the foam insulation 24. A power supply 28 is attached below the laser unit 22 and is connected by appropriate electric connections 30. The rectangular base 20 is supported by a tubular base 26 which terminates in a detachable connection to a triangular base 32. The triangular base 32 can contain 3 points, A, B, and C, with C being parallel to the alignment of the laser unit 22 and with points A and B defining a plane transverse to the alignment direction of the laser unit 22. A chain, 19 and a conventional yard marker (not shown), are attached to the laser football first down measuring device of the present invention. Modifications of the perpendicular alignment system of the laser unit 22 with the sideline of the football field is possible. For example, an extended squaring bar can be incorporated on the forward pole measuring device to help establish the perpendicularity of the laser unit 22.

Figure 1:
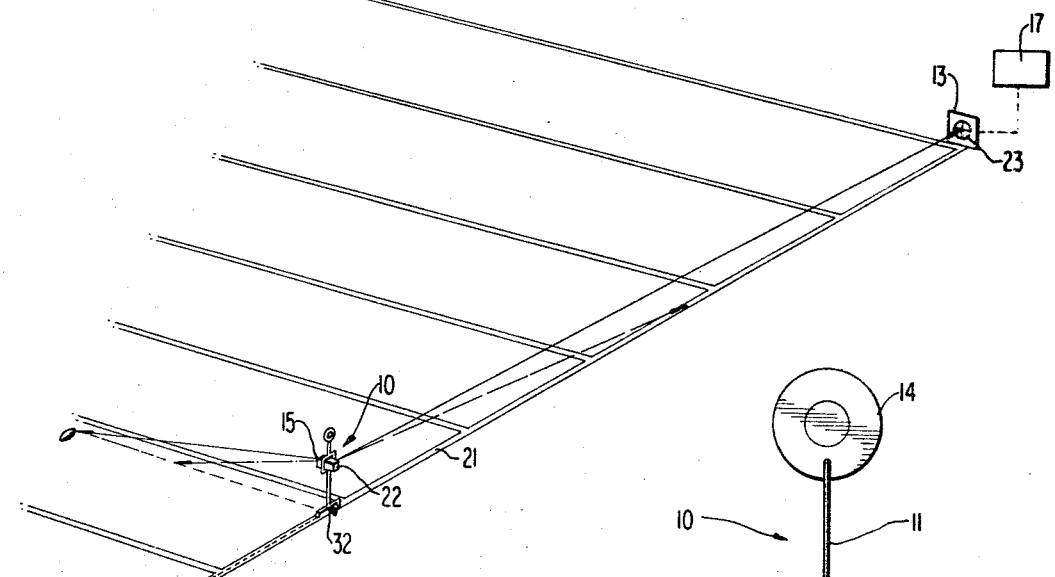
FIG. 1 is a perspective view of the present invention.

Another modification utilizes the laser beam itself as an aid in insuring the necessary alignment. Referring to FIG. 1, a beam splitter 15, such as X-Z Rt. Angle Model 594-13 made by Spectra-Physics, Inc. of California, can be utilized to divert either part of all of the laser beam at a 90° angle to the path of the laser beam in its operative measuring position. This partial or full beam is then sweeped or focused on a reference such as the sidelines 21, or a target 13 to insure the necessary perpendicularity of the measuring path for the laser beam. The target 13 can incorporate appropriate photo conductive devices 23 to record the alignment and accordingly indicate such alignment on a read out device 17.

Variations of this laser aligning are possible such as providing hinges set at 90° to the sweeping hinge 18 to use the laser beam for sweeping or focusing on a target. Fine adjustments to calibrate the angles can be incorporated to insure proper alignment.

In operation, the yard marker 10 will be placed on the sideline of the football field and aligned to insure that the laser unit 22 will be perpendicular to the sideline.

As disclosed in FIG. 1, if a beam splitter 15 or appropriate modifications are utilized to permit a laser beam to be generated at 90° to the operative ball measuring position, the operator or official will either sweep the sidelines in either direction to note a visual alignment with the sidelines or he will focus on either one or more targets 13 position for example in the end zone. The targets 13 can incorporate photo-conductive elements 23 and appropriate circuitry to generate a signal which can be seen on a display or readout device 17 as representing proper alignment.

The supporting base frame 32 will be positioned on the frame in a manner that insures that the 90° deviation of the laser beam for perpendicular alignment will be appropriately positioned with respect to the sidelines 21, for example on FIG. 3 points A and B are directly underneath the beam splitter 15.

When the ball has been moved to a position relatively close to the forward pole laser measuring device, an official will activate the laser 25 of the laser unit 22 and by pivoting the laser unit 22 about the hinge 18 on the rectangular base 20, sweep the laser beam across the football field ground in an area approximate to the ball. The contact of the laser beam with the ground or the ball will indicate its relative position and permit both the spectators, football players and the officials to judge if the ball has been moved the required distance. When the forward pole yard marker 10 must be moved to establish the next set distance, it is quickly aligned perpendicular to the sideline by either the triangular base 32 or other appropriate modifications. The unit is then ready and in an operative position to accurately establish the next set distance if called upon. By permitting the alignment system to maintain its position on the sidelines, the accuracy is increased, by removing the necessity of moving the alignment system across the field to the location of the ball. This also permits a shortening of the time conventionally required. The provision of the foam insulation 24 in the laser unit 22 helps insure a rugged construction that will meet the requirements of the game of football.

Since the above disclosure sets forth only the preferred embodiments and artisians skilled in the field would be capable of making numerous modifications, the present invention, should be determined only from the following claims.

What is claimed is:

1. In combination with a measuring device utilized in the sport of football for determining the distance that a ball must be moved on the football field to establish a first down wherein a pair of markers are connected with a flexible member, the improvement which comprises:

projecting means attached to the forward marker capable of projecting a signal visible upon contact with the field across the width of the football field;

alignment means for perpendicularly aligning the forward marker and projection means with the sidelines of the football field; and means for sweeping the projected signal across the width of the football field whereby the relative position of the ball can be ascertained from the projected visible signal.

2. The combination of claim 1, where the projecting means is a laser unit which generates a laser as a visible signal beam.

3. The combination of claim 2, where the sweeping means includes a hinge connecting the laser unit to the forward member to permit the laser unit to be pivoted in the vertical plane for sweeping the projected visible signal across the width of the football field.

4. The combination of claim 2, where the alignment means includes a beam splitter for projecting a portion of the laser beam at 90° along the sidelines to indicate perpendicularity.

5. The combination of claim 2, where the alignent means includes a triangular base member.

6. The combination of claim 3, where the projecting means further includes an outer housing and shock resistant insulation between the laser unit and the outer housing.

7. The combination of claim 4, where the alignment means further includes at least one target member positioned along the sidelines to indicate perpendicularity.

8. The combination of claim 6 where the target member includes photo-conductive means for generating a signal when the laser beam is in alignment and a dispay device for indicating alignment.

* * * * *